United States Patent [19]

Master et al.

[11] Patent Number: 4,838,691

[45] Date of Patent: Jun. 13, 1989

[54] METHOD AND APPARATUS FOR DETERMINING CALIBRATION ACCURACY OF A SCIENTIFIC INSTRUMENT

[75] Inventors: Barry S. Master, Tustin; Frank M. Aralis, Irvine, both of Calif.

[73] Assignee: Beckman Instruments, Inc., Fullerton, Calif.

[21] Appl. No.: 753,741

[22] Filed: Jul. 10, 1985

[51] Int. Cl.[4] .............................................. G01J 3/18
[52] U.S. Cl. .................... 356/319; 356/328; 356/334
[58] Field of Search ............... 356/300, 319, 320, 323, 356/325, 326, 328, 331, 332, 334; 364/498, 526; 250/252.1

[56] References Cited

U.S. PATENT DOCUMENTS

| | | | |
|---|---|---|---|
| 4,352,561 | 10/1982 | Tohyama et al. | 356/332 |
| 4,469,441 | 9/1984 | Bernier et al. | 356/334 |
| 4,519,706 | 5/1985 | Morley et al. | 356/325 |
| 4,565,447 | 1/1986 | Nelson | 356/334 |
| 4,669,878 | 6/1987 | Meier | 356/319 |

OTHER PUBLICATIONS

Papadakis et al., *Analytical Chemistry*, vol. 47, No. 9, Aug. 1975, pp. 1644–1649.
Spillman et al., *Analytical Chemistry*, vol. 48, No. 2, Feb. 1976, pp. 303–311.

Primary Examiner—F. L. Evans
Attorney, Agent, or Firm—William H. May; P. R. Harder

[57] ABSTRACT

A calibration method and apparatus for economical and rapid calibration of a scientific instrument utilizing a monochromator to generate monochromatic light utilizing controllable means for determining the angular position of a light dispersing element in the monochromator and a filter having a narrow absorption band(s) to determine a relationship between the wavelength of the monochromatic light generated by the monochromator and an angular position of the dispersing element so that the dispersing element can be rotated to an exact position for the monochromator to generate a selected wavelength of monochromatic light.

1 Claim, 1 Drawing Sheet

METHOD AND APPARATUS FOR DETERMINING CALIBRATION ACCURACY OF A SCIENTIFIC INSTRUMENT

BACKGROUND

In a spectrophotometer a beam of light of a selected wavelength or frequency is passed through a sample where some of the light is absorbed by the molecules comprising the sample. The light which passes through the sample is received by a light sensitive detector system such as a photometer. The less light energy that is absorbed by the sample results in more light being received by the light detector system. The detector system generates an electrical signal of a strength proportional to the intensity of the light it receives. The output of the light detector system, for example one utilizing a photomultiplier tube, is generally an analog current signal proportional to the light intensity received, which thus is proportional to the light transmittance of the sample.

The light detector system generally has an amplifier, such as an operational amplifier, to convert the analog current signal from the light detector to an analog d.c. voltage signal. The d.c. voltage signal is processed by additional electronics and applied to a display, such as a chart recorder, to provide a visual and/or permanent record of the sample light transmittance, i.e., absorbance (absorbance=log transmittance) at a selected light wavelength or through a wavelength scan.

The selected wavelength light beam is generated from a generally white light source through the use of a monochromator. The monochromator provides a monochromatic beam of light having a range of wavelength within a narrow controlled spectral band. This is generally accomplished by dispersing the white light received into a sweeping spectrum of differing wavelengths of light by directing the white light through a prism or reflecting the light from a dispersion grating. The monochromatic light wavelength generated by the monochromator is selected by rotating the prism or grating to direct light of the desired wavelength in the spectrum through a narrow slit or aperture out of the monochromator. The remaining light of undesired wavelengths is not permitted to pass from the monochromator. Thus, by rotating the dispersing element the light spectrum can be moved across the narrow slit to obtain a selected wavelength monochromatic light for application to the sample.

The spectral bandwidth of the monochromatic light generated by the monochromator is determined by the width of the slit, the dispersion function of the dispersing element, and the rotational location of the dispersing element relative to the slit. Change in wavelength of the monochromatic light generated, however, usually does not have a linear relationship with change in the angular position of the dispersing element. That is, the wavelength light generated is not a linear function of the dispersing element's change in angle of rotation. Generally, the wavelength of light generated by the monochromator is related to the rotational position of the dispersing element by the following formula:

$$\lambda = K \sin \theta \quad (1)$$

where, $\lambda$ = wavelength of monochromatic light $K$ = dispersion constant, e.g. grating constant $\theta$ = angular position of dispersing element (from a base position In order to obtain accurate performance of the spectrophotometer in analysis of a sample it is very important to be able to accurately generate a select and stable monochromatic light beam for application to the sample. This requires repeatable and precise positioning of the dispersing element in the proper angular position. Manufacture of the instrument components including the dispersing element and its positioning mechanism, and assembly of these components in the instruments, must be performed with very high precision. A complex, highly precise, and expensive mechanism is necessary to direct the dispersing element. Furthermore, the nonlinear relationship between the rotational change of the dispersing element and the change in wavelength of the monochromatic light generated additionally complicates the positioning mechanism design. Prior designs have incorporated complex linkages, precision cams, and specially designed gears to accomplish approximation of linearity between rotation of the dispersing element and wavelength selection in order to obtain accuracy repeatability and ease of use.

With these designs costly and time consuming calibration procedures are necessary to assure proper optical alignment of the assembly and to correct manufacturing variances in the optical elements. Failure to provide either intensive quality control or calibration would often result in the spectrophotometer which was unable to accurately analyze, or reproduce accurately the analysis of, the substances for which it was designed.

A method and apparatus for performing a rapid, accurate and automatic calibration of a scientific instrument utilizing select monochromatic light generated by a monochromator is described herein. The described method and apparatus resolve the problems associated with calibration of scientific instruments discussed above to assure that the instrument consistently performs its function with high accuracy. This calibration procedure utilizes an absorption medium which is placed at or near a sample position to provide information relating the function of the monochromator to the light wavelength generated. Though accurate and reliable in performing instrument calibration, i.e. monochromator calibration, the calibration procedure described cannot overcome errors due to improper care in cleaning of the sample chamber of such an instrument. Since the absorption medium is placed within the sample compartment, any sample residue remaining in the sample compartment which absorbs light could affect calibration procedure. This is particularly critical with the described procedure since the computer in performing calibration is searching for an absorbance event to determine the assignment of a light wavelength to a dispersing element angular position. A false indication of absorbance would result in an incorrect angular position being assigned to a certain wavelength, and invalidate instrument calibration.

A need thus exists in the field of scientific instrumentation which utilizes varying wavelength monochromatic light for a select purpose, and in the manufacture of spectrophotometers in particular, to resolve the difficulties associated with their calibration when interfering substances are permitted to remain in the sample chamber and to provide accuracy and reproducibility in their function through effective calibration.

SUMMARY OF THE INVENTION

The present method for obtaining calibration of scientific instrument utilizing a monochromator to generate a select wavelength of monochromatic light from generally polychromatic light and for determining if interferences have effects on the calibration procedure comprises the following steps. First, a known light absorbing medium having an absorption characteristic which is clearly identifiable, stable and within a narrow and measurable spectral band is placed in the path of the monochromatic light beam leaving the monochromator in a position approximating that of a sample. The absorption characteristics of the medium must be such that it is narrowly receptive to a known light wavelength(s) within an included region of the dispersion spectrum. Many known filters can be utilized for this purpose. Means are provided to selectively position the absorbing medium, e.g. filter, in the light path.

Next, the dispersing element of the monochromator is rotationally controlled in step-wise fashion such that a number of individual step-like angular positions are progressed in determining the position of the dispersing element. The number of individual angular positions measurable should be at least as many as the desired wavelength accuracy of the monochromatic light beam generated by the monochromator. The dispersing element is controlled in its rotational or angular position and record is made of a certain select rotational position(s) of the dispersing element of the monochromator to determine a base (angular) position, preferably that at which the monochromator generates a "zero order light" energy. Dispersing element control can be accomplished through use of a stepper motor which is driven by a computer or microprocessor including a memory means for retaining information regarding the selected rotational positions of the dispersing element.

The dispersing element of the monochromator is controlled to an initial position within its scan range of a first order dispersion spectrum, then proceeds to scan the spectrum in a direction toward incident light. A range of angular position is examined to determine the "zero order light" position of the dispersing element where it is angularly positioned to substantially reflect the polychromatic light beam it receives. At this position the energy level of the reflected light beam, known as "zero order light", is of a magnitude many times greater than the energy level of any wavelength of light within the first order of the dispersion spectrum obtained from the dispersing element. The angular position of the dispersing element in the monochromator at the "zero order light" position is identified by the computer and retained in memory as a base (angular) position for the dispersing element.

Rotation of the dispersing element is reversed and the element is directed to generate a scan through a first order dispersion spectrum. The light sensing detector measures the energy level of light passing through the absorbing medium, e.g. filter, as the dispersing element scans. When the dispersing element reaches an angular position during the scan to generate monochromatic light of the wavelength which is absorbed by the absorbing medium, the light detector indicates a substantial reduction in light energy received by producing a change in the output signal. When this change in output signal is received by the computer, the rotational (i.e. step) position of the dispersing element is determined relative to the base position and the number of step-like increments which it is has rotated is calculated. This position information is entered into the computer memory. Since the light absorbing medium is selected for a known narrow absorption band when the output signal of the light sensing detector changes, the rotational position of the dispersing element can be correlated with a spectral band of a certain wavelength monochromatic light equalling the absorption band of the light absorbing medium. The angular position of the dispersing element correlated to generation of the certain (absorbed) wavelength light by the monochromator can be used with the base position information to interpolate the required angular position of the dispersing element to generate any other desired wavelength of monochromatic light through the known grating function. Once the base and the absorption correlated positions are found, the interpolation function can be easily accomplished through modern computers or microprocessors such as is used to control the dispersing element.

Preferably, a light absorbing medium is selected which has a plurality of light absorption bands so that the rotational position of the dispersing element can be correlated with a spectral band of more than one wavelength of monochromatic light. Identifying a rotational position of the dispersing element relative to a plurality of monochromatic light wavelengths improves the accuracy with which rotational positions of the dispersing element can be determined through interpolation for other wavelengths of light. It also indicates that interferences, such as a light absorbing residual sample material left in the sample compartment, do not affect calibration of the monochromator.

Interferences from residual sample material in performing the above-described calibration procedure are ascertainable by comparison of the difference in angular position of the dispersing element between the base position, the first absorbance band position and/or the second absorbance band position. Comparison between the relative angular position of the dispersing medium for any two of these assigned values, and preferably all of these values, with empirically determined reference values provides a measure of the accuracy of the calibration. When the scientific instrument is first turned on after manufacture and the sample chamber is known to be free from contaminants, i.e. residual sample material, a measurement of dispersing element's angular position at the base position, first absorbance band position and the second absorbance band position is made. The angular position values, i.e. step positions of the rotational control, are entered into the memory means of the computer. The difference in relative angle and/or step position for these assigned values is determined and retained in nonvolatile (permanent) memory. When calibration of the instrument is performed each time after initial start-up, the difference in values of angular position and/or the difference in step position of these base position, first absorbance position and/or second absorbance position are calculated and compared with the difference between the initial values measured. If the difference in the selected values between the initially measured angular/step position and the present measured angular/step position are greater than an empirically determined range of difference, the calibration of the instrument is found to be inaccurate and an indication of such is given to the users that the instrument is not used to perform its function until further calibration or corrective procedures are taken.

Calibration of the scientific instrument and monochromator utilizing this method is preferably performed each time the instrument is turned on. The simplicity and speed with which the above-described method of calibration can be performed makes frequent calibration of the instrument possible. This clearly improves the instrument's ability to accurately perform the function for which it is designed. Additionally, the instrument can be manufactured with less concern regarding precision of the individual parts and their assembly since the ease and speed of this method of calibration permits the scientific instrument to calibrate automatically, accurately and frequently.

DESCRIPTION OF THE PREFERRED EMBODIMENT

Figure 1:
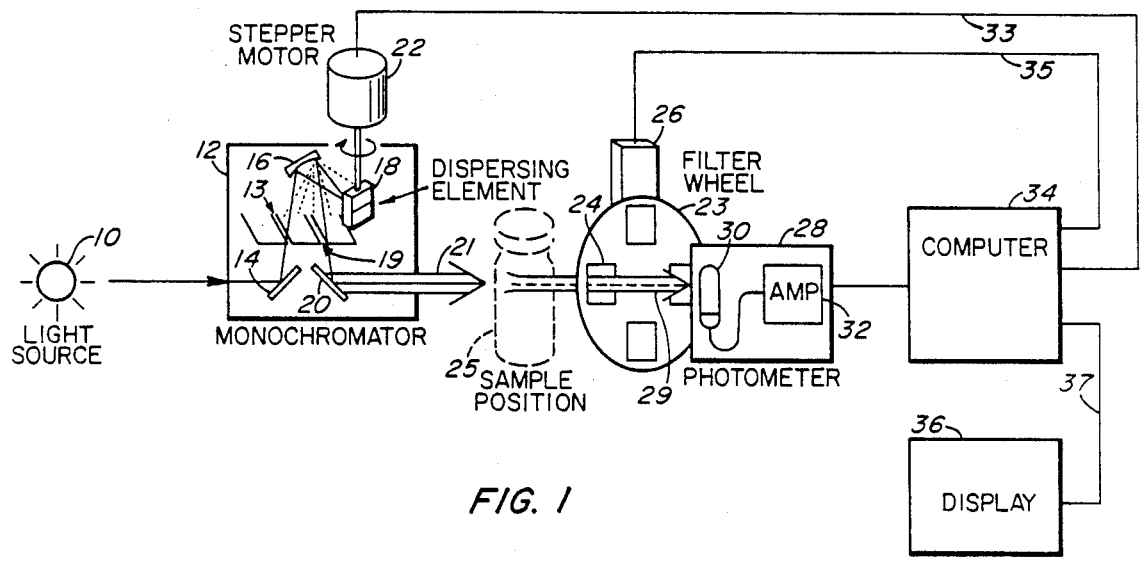
FIG. 1 is a schematic representation of the elements of a spectrophotometer including a stepper motor for directing rotation of the dispersing element of a monochromator and a light absorbing medium (filter) including means for positioning the filter in a sample position.

A spectrophotometer for which the described method of calibration is applicable is schematically depicted in FIG. 1. A light source 10 directs a beam of polychromatic light into a monochromator 12. Within the monochromator the beam of light is redirected by a reflecting element 14 through a first slit 13 to collimate the light. The light is received by a collimating mirror 16 and directed to the surface of a rotatable dispersing element 18, which is a dispersion grating. The light is reflected from the surface of the grating 18 back to the collimating mirror 16 and redirected through a second slit 19. The light reflected from the grating 18 will generally be dispersed into a spectrum of individual wavelengths of light and the slit 19 permits only a narrow spectral band of light, preferably of a single wavelength, to exit the monochromator. The slit width of the second slit 19 is selected to substantially permit only an individual wavelength or a narrow spectral band of light to leave the monochromator. The monochromatic light beam passing through the slit 19 is received by a second reflecting element 20 and directed out of the monochromator towards the sample position 25, as shown by light beam 21.

The dispersion grating 18 is mounted on the shaft of a stepper motor 22 and the rotational position of the dispersion grating is controlled by the stepper motor. Stepper motors are commonly known in electronic arts and provide a plurality of individual step-like angular positions through which the shaft of the motor may be measurably turned and at which the motor shaft may be stopped. The stepper motor 22 thus provides very accurate control of the angular position of the attached grating 18 and can be utilized to accurately determine and select the angular position of the grating as desired. The stepper motor 22 is controlled and its position determined through input/output line 33 connected to a computer 34. Computer 34 is a typical microprocessor based computer which provides control of and memory facilities for identifying the rotational position of the stepper motor 22, i.e. the grating 18, and directing rotation of the motor shaft to change the angular position of the grating 18.

A light absorbing medium such as a filter 24 is provided for selective positioning in the path of the monochromatic light beam 21 exiting the monochromator 12. Preferably, the filter 24 is positioned for entry into the monochromatic light beam near to or at the sample position 25 at which a sample is placed for analysis. The filter 24 is preferably supported in a filter wheel 23 and controlled by a directing means 26. A simple filter wheel design may comprise a plurality of filters and have an open window position, as is commonly known and used in spectrophotometer design. Control of filter wheel position is directed through output line 35 from the computer 34. Control signals from the computer are applied through line 35 to the directing means 26 to position any one of the filters, including filter 24, or the window in the path of the monochromatic light beam 21.

Figure 2:
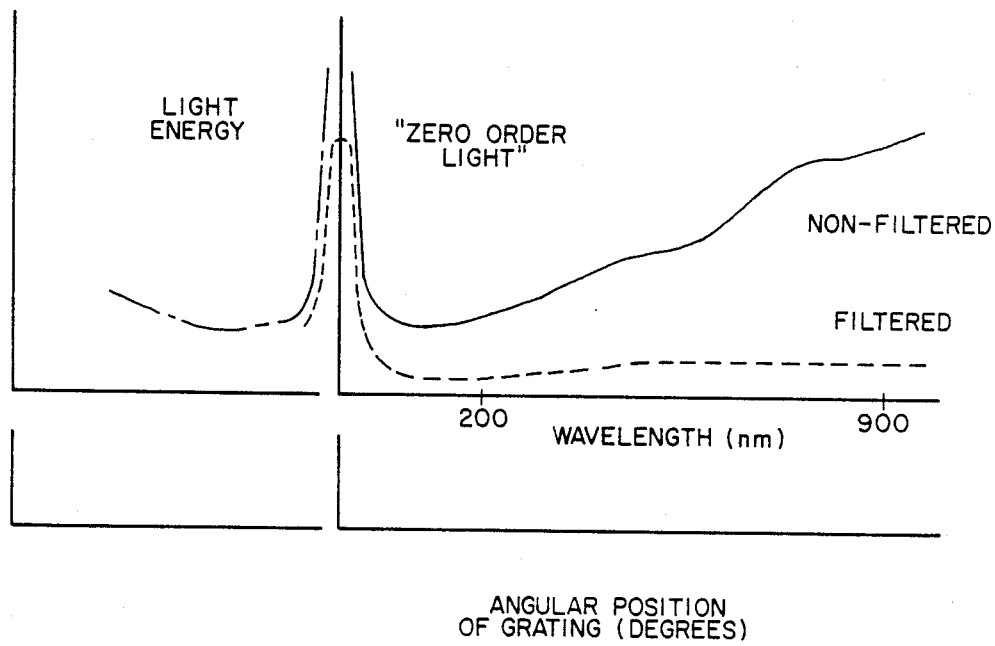
FIG. 2 is a graphical depiction of the absorption characteristics of a light absorbing medium such as a filter having two distinct light absorption bands which is used in performing the described calibration method, with a second horizontal coordinate scale axis correlating the angular position of the dispersing element, e.g. grating, at the absorption bands in terms of angular displacement from a base position at which the dispersing element generates zero order light.

The filter 24 is preferably comprised of didymium glass. Didymium glass has unique absorption characteristics which are depicted in the graph of FIG. 2 where light energy of the light beam 27 having passed through the filter is plotted against the individual wavelengths of the monochromatic light generated by the monochromator as the grating 18 is rotated through a scan of the first order spectrum. As shown, didymium glass exhibits strong and relatively narrow absorption bands about two individual light wavelengths, those being 585.5 nm and 807.1 nm. These two individual and distinct absorption bands can be advantageously used to correlate the rotational position of the grating 18 with a desired wavelength light to be generated by the monochromator 12 through identification of the respective rotational step at which the stepper motor 22 resides when they are detected.

In FIG. 2, the rotational position of the grating 18 at which monochromatic light of a wavelength which is absorbed by the filter 24 is generated, is indicated on the second horizontal coordinate scale as $\theta_1$ and $\theta_2$, respectively. These two individual angles are determinable through the stepper motor 22 as a specific step number or number of steps from a base position, as determined by the computer 34 which controls and monitors the stepper motor 22. For instance, once a base position is determined for the rotation of the stepper motor 22, the number of steps through which the stepper motor rotates until a selected signal indicating absorption of light is received from the light sensing detector 30, are countable by the computer 34. In this manner the exact rotational position of the grating 18 can be determined. Similarly, changes in the rotational position of the grating 18 can be accomplished by directing the stepper motor 22, through the computer 34 to rotate a defined number of steps to change the angular position of the grating 18.

The monochromatic light beam 21-27 passing through the filter 24 or sample position 25 is received by a light sensing detector such as photometer 28. The photometer generally comprises a photomultiplier tube 30 (PMT) which generates a current signal in response to the light energy received. The current signal produced by the PMT 30 is applied to an operational amplifier 32 which generates the d.c. voltage signal, which in turn is input to computer 34 providing a measure of light intensity received by the photometer.

A display 36, usually indicating the light energy received by the photometer or information such as transmittance, absorbance or concentration related thereto, is directed by the computer 34 and may include such elements as a chart recorder, an analog scale meter and/or a digital display.

With regard to the spectrophotometer schematically shown in FIG. 1 and the graphical depiction shown in FIG. 2 of the light energy received by the photometer 28 in a monochromatic light beam passing through the filter 24 as the grating 18 is directed to scan, the method of calibration of the spectrophotometer (i.e. the monochromator) proceeds as follows. When the spectrophotometer is turned on the light source 10 is illuminated supplying a light beam to the monochromator 12 and the calibration method begins. The grating 18 is rotated to a selected position as directed by the computer 34 which corresponds to a selected step number for the stepper motor 22 held in the computer memory. The step number is selected to position the grating within or near the end of the first order dispersion spectrum. This step position can be the last step position at which the grating was positioned during the last use of the spectrophotometer. Usually, rotation of the grating in this manner corresponds to moving through the energy profile from left to right in the graphical depiction of FIG. 2.

The grating 18 is next rotated to a position in which it substantially reflects the light directed to its surface, which is known as the "zero order light" position as previously described. There are many means which may be utilized of identifying the "zero order light" position of the grating 18 within the energy (spectral) range of zero order light, such as position sensors, detectors, etc. Preferably, the "zero order light" position of the grating is determined by a method in which the light output of the monochromator is measured to determine the position of the grating 18 at which "zero order light" is generated.

When the "zero order light" position of the grating 18 is found and the grating 18 positioned therein, the computer 34 assigns the base position (i.e. zero degrees rotation-zero steps) to this rotational position of the grating 18. The step position of stepper motor 22 at this rotational position is entered into the memory of the computer 34. Thus as rotation of the grating 18 is directed by the computer through stepper motor 22, the exact angular position of the grating 18 may be determined through "counting" the number of steps through which the stepper motor has rotated from the assigned base position. Similarly, an exact angular position of the grating 18 may be obtained by rotating the stepper motor to an identifiable step number from the base position.

Next, filter wheel 23 is rotated to position filter 24 in the monochromatic light beam exiting the monochromator by directing means 26 as instructed by the computer 34. The grating 18 is rotated to generate a first order dispersion spectrum from the monochromator 12 over a period of time. As the grating 18 moves from the base position the photometer 28 detects the monochromatic light beam 21-27 exiting the monochromator and transmitted through the filter 24. The light energy detected by the photometer 28 corresponds to the graphical depiction of FIG. 2 by moving from left to right along the light energy profile from the "zero order light" position. As the grating 18 continues to rotate the wavelength of the monochromatic light generated by the monochromator increases and reaches a first absorption band as indicated by the first valley in the light energy profile surrounding the 585.5 nm light wavelength. This is identifiable by a substantial reduction in the light energy transmitted by the filter 24, due to the filter's absorbance of light at this wavelength, and thus a reduction in the voltage of the signal output by the photometer 28. The first absorption band of the didymium glass filter is relatively narrow and the angular position $\theta_1$ of the grating 18 may be accurately determined when the voltage level of photometer signal reaches a minimum value. The computer 34 has been maintaining counts of the number of steps which the stepper motor 22 has progressed from the base position in generating the scan to the first absorption band. The angular position of the grating at which monochromatic light is of a wavelength within the narrow absorption band is generated is positively identifiable by the step position of the stepper motor 22. This number of steps and step position is recorded in the computer memory. Since it is known that the first absorption band of the didymium glass filter 24 occurs at a 585.5 nm light wavelength, the step position at which the stepper motor resides when the grating 18 first produces monochromatic light which is absorbed by the filter as the first order spectrum is scanned, can be assigned a wavelength value of 585.5 by the computer 34. This correlation is retained in the memory of computer 31.

Rotation of the grating 18 is continued until the second absorption band of the didyminum glass filter is reached which is again indicated by a substantial reduction in the voltage of the output signal of photometer 28. This reduction in signal voltage level is caused by the didymium glass filter 24 absorbing a second wavelength of monochromatic light, thus reducing the light energy received by the photometer 28 as indicated in FIG. 2 by the second "valley" or the light energy profile surrounding the 807.1 nm light wavelength. Again the step position of the stepper motor 22 identifying the angular position of the grating 18 is determined, and the step position, i.e. number of steps progressed by the stepper motor, is entered in computer memory. Since it is known that the second absorption band of the didymium glass filter 24 occurs at a 807.1 nm light wavelength, the step position at which the stepper motor resides when the grating produces monochromatic light which is absorbed by the filter 24 for the second time as the first order spectrum is scanned, can be assigned a wavelength value of 807.1 nm by the computer 34. This second step position of the stepper motor correlated with a 807.1 nm wavelength value is retained in the memory of computer 34.

With the zero order light position, the first absorption band position and the second absorption band position of the grating 18 determined by identification of the step position of the stepper motor 22 at which they occur, the computer 34 can easily interpolate the wavelength vs. angular position of the grating relationship and solve the grating constant in Equation (1) discussed above. With the equation value solved and the retained correlations of grating position at 585.5 nm and 807.1 nm, selection of light of a desired wavelength for sample analysis can be easily accomplished by the computer 34. The grating 18 is rotated by stepper motor 22 to a determined step position calculated through use of the Equation (1) and the retained memory information by the computer, so that the monochromator will generate the desired wavelength monochromatic light. This relationship between the wavelength and stepper motor position, i.e. angular position of the grating, can be calculated by a number of known methods applicable to computer statistical processing and generally utilized with and performed by microprocessor based computers as described herein, and known to those skilled in the art.

Next the computer determines the difference in angular position of the grating between the first absorption band position and the second absorption band position. This can be easily determined by the number of step positions between the step position for the first absorption band and the step position for the second absorption band, e.g. by subtracting the first step position from the second step position. This value will be referred to herein as the absorbance position difference (APD). The APD value is retained in computer memory.

The computer can have three step position values in memory in addition to the base position; the step position value of the first absorbance band, the step position value of the second absorbance band and the APD value. These values have been determined as the grating 18 was directed to scan a first order spectrum by measuring the light energy passed through the didynium glass filter 24, as described above. This exact calibration procedure as described is performed by the instrument when the instrument is first turned on after its manufacture. Since the instrument has not been used and quality control requirements have assured a high degree of cleanliness in assembly, the step positions for the first absorbance band, second absorbance band and APD are qualitative values for the particular instrument. These initial step position values are placed in nonvolatile (i.e. permanent), computer memory to act as reference values for the instrument for determining the accuracy of instrument calibration. The initially determined step positions for the first absorbance band, second absorbance band and the APD are compared with those measured each time the instrument is calibrated. The difference between each calibration step position measurement and each initial step position measurement is determinable and comparable to an empirically determinable range of difference which is permissible if the instrument has performed accurate calibration. The empirically determined range of difference has been found to be the step position range of the particular stepper motor utilized in a particular instrument which corresponds to a change in monochromatic light wavelength $\pm 4$ nm.

To show how this can be effective, reference is made to FIG. 2 and the interfering substance absorption band indicated by broken line in the light energy profile. If during use the spectrophotometer residual sample material which absorbs light is left in the sample chamber and inteferring absorbance bands such as shown could be generated such as where as shown the sample absorbed light at approximately 600 nm wavelength, during performance of calibration the instrument would find the interferring absorbance band as a second absorbance band detectable as the grating was directed to perform a scan. If means were not provided to determine that the second absorption band detected was not the correct absorption band at 807.1 nm, the instrument would assign a step position value corresponding to the grating angular position to the 807.1 wavelength value which was incorrect. The calculations performed by the computer to determine the grating constant would be incorrect as would any further directions provided by the computer to direct grating angular position for selecting the wavelength of the monochromatic light desired.

However, by comparing the difference in step position value for the first absorbance band and for the second "measured absorbance band" (which in this case is the interferring absorbance band), in other words the measured calibration APD with the initially measured APD, the difference between the measured calibration APD and the initial APD will be far outside the range of deviation permitted in step position (i.e. $\pm 4$ nm) and the calibration will be found to be incorrect.

Similarly, this function can be performed relative to the base position, i.e. zero step position, in relation to the step position of the first absorbing band and/or in relation to the step position of the second absorbing band, as indicated by $\theta_1$ and $\theta_2$, respectively. Preferably, at least the difference between the measured calibration APD and initial APD and the difference between the measured calibration step position of one of the absorbance bands with the initially measured step position for that absorbance band would be performed.

The filter 24 is now removed from the monochromatic light beam by directing means 26 as controlled by computer 34 and the spectrophotometer is ready for selection of an appropriate wavelength light and sample analysis.

The base position of the grating 18 may be determined in an alternative manner after positioning the filter 24 in the light path of the monochromatic light beam 21 exiting the monochromator, since the absorptive characteristics of the filter 24 are not required in its identification.

Since the calibration of an instrument utilizing the described method is performed each time the instrument is turned on, the accuracy with which the spectrophotometer can perform sample analysis is greatly enhanced. Changes due to environment, use or other events are automatically compensated for since the instrument is newly calibrated each time it is used. The user is assured that accurate calibration has occurred and that inteferring substances are not present within the sample chamber of the spectrophotometer. Furthermore, the requirements for calibration of the instrument during manufacture and reproducibility of components of identical optical characteristics are greatly reduced since the instrument is capable of automatically calibrating itself each time it is turned on.

What is claimed is:

1. In a scientific instrument having a rotatable dispersing element in an optical system for generation of a select wavelength monochromatic light, a method for determining accuracy of calibration of the rotation position control of said dispersing element relative to a wavelength of light monochromatic generated as compared to the wavelength of light selected, comprising the steps of:
   (a) determining an initial position of the light dispersing element;
   (b) positioning a light absorbing medium in the path of said monochromatic light beam so as not to interfere with the sample position in the instrument, said medium comprising material having a plurality of identifiable light absorbance characteristics relative to light wavelength;

(c) rotating said dispersing element to scan a light spectrum through the optical system while detecting the energy level of the scanned wavelengths of monochromatic light obtained;

(d) determining a first angular position of said dispersing element by detecting a reduced light energy level when monochromatic light of the wavelength identifiable by a first absorbance characteristic of said absorbing medium is generated;

(e) determining a second angular position of said dispersing element by detecting a reduced light energy level when monochromatic light of a wavelength identifiable by a second absorbance characteristic of said light absorbing medium is generated;

(f) determining the difference between said first angular position and said second angular position to provide an initial reference value for said difference;

(g) determining the difference between said first angular position and said second angular position following calibration of said scientific instrument prior to use;

(h) comparing the difference determined between said initial reference difference between said angular positions and said measured difference between said angular positions with an empirically determined value;

(i) indicating that the scientific instrument is not properly calibrated if the determined difference is greater than the empirical value.

* * * * *